UNITED STATES PATENT OFFICE.

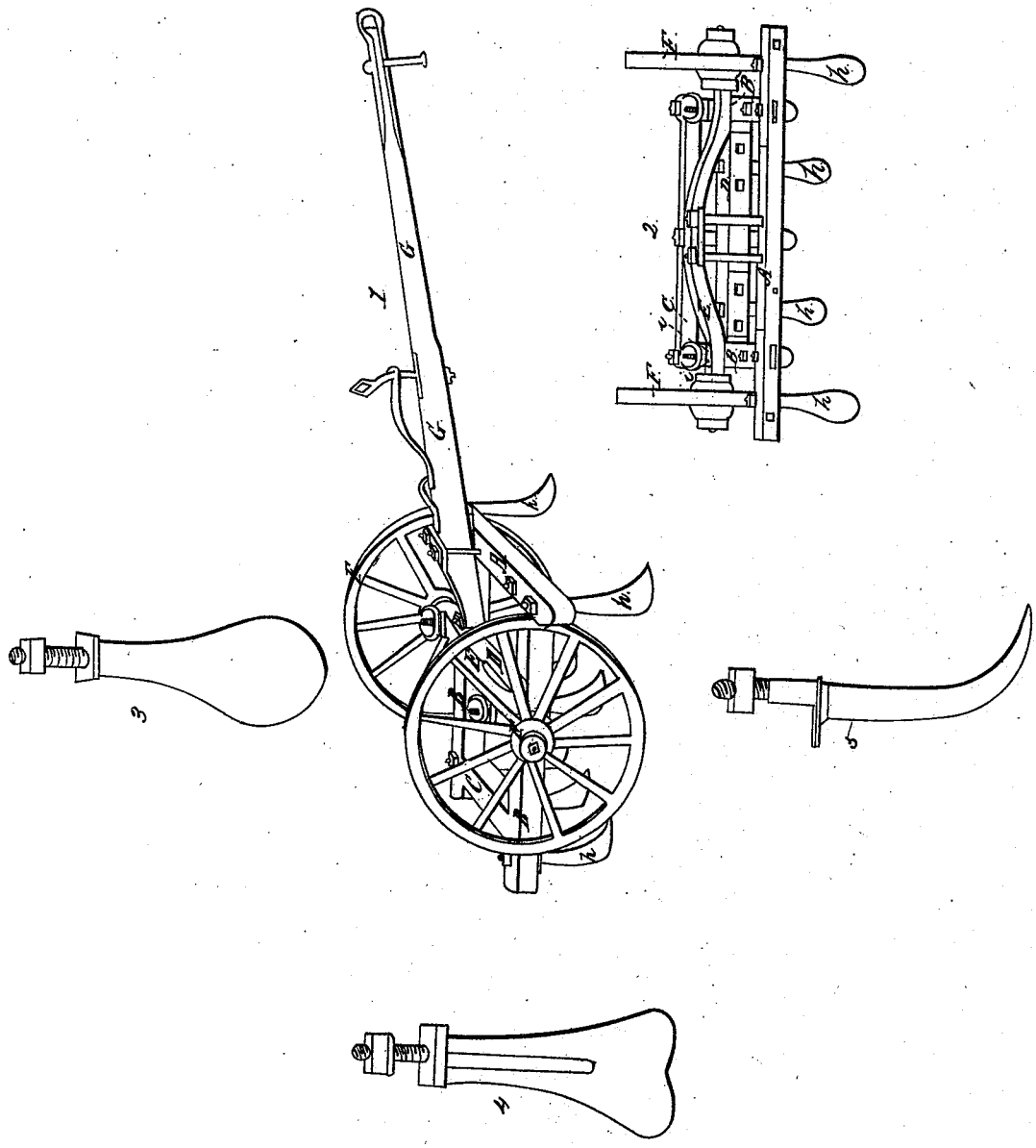
J. Paterson.
Wheel Cultivator.
Nº 5,075.  Patented Apr. 17, 1847.

JOHN PATERSON, OF MEDINA, NEW YORK.

IMPROVEMENT IN CULTIVATORS.

Specification forming part of Letters Patent No. 5,075, dated April 17, 1847.

*To all whom it may concern:*

Be it known that I, JOHN PATERSON, of Medina, in the county of Orleans and State of New York, have invented new and useful Improvements in Wheel-Cultivators; and I do hereby declare that the following is a full, clear, and exact description of the principal character thereof, which distinguishes it from all others before known, and of the manner of making, constructing, and using the same, reference being had to the accompanying drawings, making part of this specification, in which—

Figure 1 is a plan. Fig. 2 is a front or end view; and Figs. 3, 4, 5, front, side, and back views of the teeth.

The nature of my invention consists in the arrangement of the cultivator-teeth in the following order: two in the front beam, directly front of the wheel, by which arrangement a track is made for the wheels, which lessens the liability of the wheels to be raised by passing over stone, unbroken turf, or lumps of earth, and two teeth in the center beam, eleven inches from each wheel, which are sufficiently distant from the wheel to prevent anything from wedging between the teeth and wheels to clog or obstruct the motion of the wheels, and with the arrangement of the front teeth cannot fail to secure an even and uniform cultivation of the soil. The other three teeth are placed in the back rail. This is combined with a pair of sustaining or carrying wheels the bearing-points of which are one foot and nine inches from the outside of the front teeth, at a point on which the frame poises, so that by this arrangement the team is relieved from any strain or load to which it might be liable by too great a movement of the beam up and down as the teeth cut more or less deep. By this arrangement the necessity for guiding wheels or handles is dispensed with.

In all the wheel-cultivators with which I am acquainted the teeth have been between the wheels, and so near as to be liable to clog and do their work unevenly, in consequence of the wheels passing over obstacles—such as stone, turf, lumps of earth, &c.—while they, being outside of the teeth, leave a strip of land uncultivated next to walls, stumps, fences, or ditches of from one to two feet, all of which objections to other cultivators are obviated by this arrangement and combination above described. The size of the wheel will allow of its being turned upside down and drawn as a cart over grounds not to be cultivated.

The machine consists of an oblong square frame four feet seven inches wide, including the projections of the front beam, which are ten inches by two feet ten inches. The front beam, A, is four feet seven inches, three by four inches square, of oak or other suitable timber. The side rails, B B, are three feet ten inches and one-half long, exclusive of the projections, which are four inches behind, and thereby four inches square. The hind rail, C, and the middle rail, D, are two feet one and a half inch long, exclusive of the tenons. The central rail, D, is eighteen and one-half inches back of the front beam, and the back rail, C, is sixteen inches back of the center rail, D. The two front teeth are placed in the front beam five and one-fourth inches outside of the side rails. The two middle teeth are placed in the center rail five and one-fourth inches from the inside of the side rails. The three back teeth are placed in a line. The outside ones are in the side rails and the center one in the center of the back rail. The teeth are seven in number, and are one and a quarter inch square where they go through the rails, and are fastened with a screw-nut on the upper side, and project below the frame eleven inches perpendicular; but the whole length of the tooth below the frame is thirteen inches, gradually inclining or curving forward until the point enters the ground. The curve or inclination forward is about five inches. The lower end or cutting part of the tooth is pointed and gradually swells or enlarges until it becomes five and a half inches wide four inches from the point, and gradually diminishes up to the shoulder, and is rounding on the front. The shoulder of the tooth projects or runs back from the neck from an inch to an inch and a half. The points of the teeth are laid with steel as far up as they are liable to wear. On the back of the tooth, below the shoulder of which it forms a part, is laid a piece of iron for a brace one inch square and four inches long, and is welded to the neck of the tooth, and the lower part is drawn to a point and left unwelded and detached. The object of this brace is to support the teeth, or the teeth may be made of bars of iron one inch and a quarter square, in the same shape, and the lower and front part made of a plate of cast-steel, bolted or riveted on that bar up to the shoulder, which could be easily replaced with less expense than the kind of teeth above described.

There are two wheels, F F, attached to the machine, one on each side, two feet and a half in diameter, placed on the axle-tree E. The axle-tree E is made of maple or hickory, two and a half by four inches square, and hollowed out on the lower side, so as to allow the tongue to pass under it to the center beam, to which it is bolted. The axle-tree is also rounded on the top, so that it is a square of two and a half inches, and is fastened to the side rails by two bolts ten inches long, so as to allow of graduating the cut or draft of the teeth, for which are placed above or below two graduating gage keys or blocks, as may be necessary. The gage-keys are ordinarily made of a square or round block, with a hole in the center, and can only be placed above or below the axle-tree by taking the axle-tree off; but these are made of square blocks of wood, with a hole in the center for the reception of the bolts, with an opening out to one side, so as to allow of being placed above or below the axle-tree without removing it, but by merely starting the nut. The tongue is fastened to the center cross-rail by a bolt and screw-nut by passing through an oblong hole and to the front beam by a staple-bolt passing through it and up each side of the tongue, with a cross-bar on the upper side of the tongue connecting the two legs the staple, which is held firm by two nut-screws.

Between the tongue and the front beam is a wedge for regulating the position of the tongues to suit the convenience of the team. The tongue is eight and one-half feet long from the front beam, and is made like a wagon-tongue, except its connection with the frame.

The machine is used for the cultivation of land for farming purposes. With one team of horses from eight to ten acres of land can be cultivated in a day, and its use more effectually destroys weeds than a harrow or common cultivator. It cheapens the cost of cultivation, while it cultivates to a uniform depth.

I claim—

The arrangement of the cultivator-teeth as herein set forth, when such arrangement is combined with a wheel-cultivator in which the position of the wheels with reference to the teeth is such as herein set forth.

JOHN PATERSON.

Witnesses:
C. C. GREEN,
H. M. STEWART.